United States Patent Office 3,543,138
Patented Nov. 24, 1970

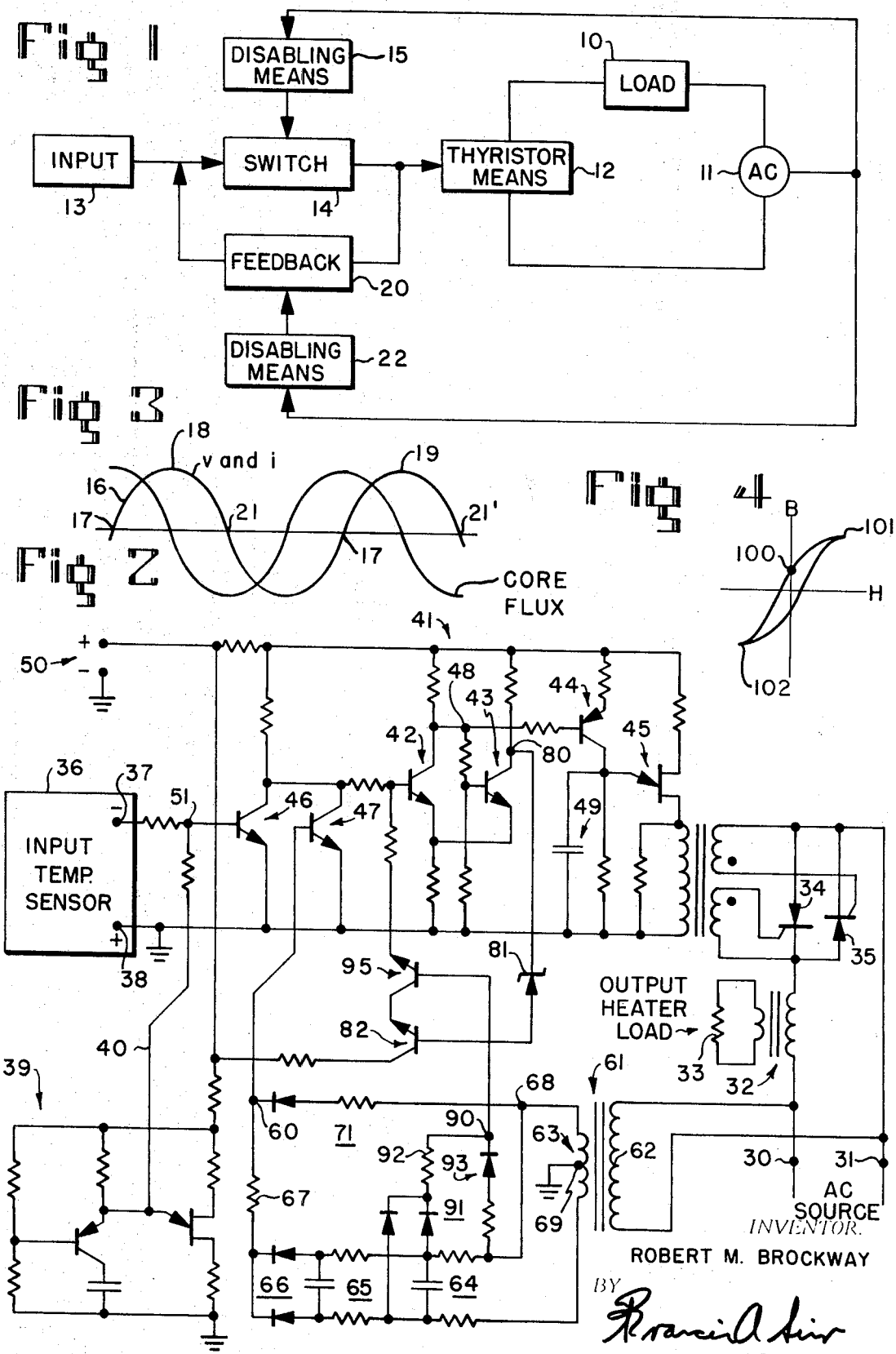

3,543,138
BURST FIRING CONTROL APPARATUS
Robert M. Brockway, Edina, Minn., assignor to Honeywell Inc., Minneapolis, Minn., a corporation of Delaware
Filed May 24, 1968, Ser. No. 731,920
Int. Cl. G05f 1/44
U.S. Cl. 323—19     10 Claims

ABSTRACT OF THE DISCLOSURE

Apparatus for burst firing alternating current energized thyristor means at 90° on the voltage waveform and then maintaining conduction for an even number of half cycles, where a switch means which controls the thyristor means is maintained inoperative at all times other than at reoccurring 90° intervals on the voltage waveform, the switch means then switching from a stable to an unstable state to fire the thyristor means in response to an input signal, where a feedback structure then maintains the switch means in the unstable state, and where the feedback structure is rendered inoperative at reoccurring intervals which lag the first interval by more than 270° but less than 360°.

BACKGROUND OF THE INVENTION

Burst firing of alternating current energized thyristor means provides modulation of power to a load by means of the variable time duration of the burst. To avoid radio frequency interference, prior art devices fire the thyristor means at the zero load current or voltage crossover. Also, in the case of a transformer load, it is known that the load should be energized at 90° on the voltage waveform, when the flux waveform is going through zero.

BRIEF SUMMARY OF THE INVENTION

I accomplish burst firing of thyristor means by utilizing a switch having a stable state and an unstable state. So long as the switch is in the stable state, the thyristor means is nonconductive. When the switch assumes its unstable state, the thyristor means conducts and continues to conduct as long as the switch remains in its unstable state.

The beginning of a firing burst is achieved by means of a first disabling means which prevents the switch from assuming its unstable state at all times other than at a first predetermined interval (90°) in each cycle of the alternating current supply.

During this interval, the switch may respond to an input signal, to assume its unstable state and fire the thyristor means.

Once the switch assumes its unstable state, feedback means maintains the switch in the unstable state. To achieve an even number of half cycles of energization of the load, a second disabling means disables the feedback means at a second predetermined interval in each cycle, this second interval lagging the first interval by a least an even number of zero-crossover points of the alternating current (270°) but less than to said first predetermined interval in a subsequent cycle of the alternating current (360°).

Thus, a switching decision is made only during the first intervals, (at 90° on the voltage waveform) with the length of the burst being determined by the input signal. The feedback means, which holds the switch in its unstable state, insures that the thyristor means will conduct through two zero load current crossover points (one displaced 90° from the first mentioned interval, and one displaced 270° from the first mentioned interval). Sometime after this last mentioned current crossover point (360° on the voltage waveform), and before the subsequent first mentioned interval (90° on the voltage waveform), the feedback is disabled and the switch is conditioned to be controlled by the input signal.

BRIEF DESCRIPTION OF THE DRAWING

FIG. 1 is a block diagram showing of my invention, including thyristor means and a load to be controlled thereby;

FIG. 2 is a showing of an embodiment of the invention disclosed in FIG. 1;

FIG. 3 is a sine wave representation of the alternating current supply voltage and the load current which flows through the load of FIG. 2, and a sine wave representation of the load transformer core flux; and FIG. 4 is a typical transformer core hysteresis curve.

DESCRIPTION OF THE PREFERRED EMBODIMENTS

Referring to FIG. 1, a load 10 is to be energized from an alternating current source 11 under the control of a thyristor means 12. The structure 10, 11, and 12 forms a series circuit. When thyristor 12 is conductive, load 10 is energized. Specifically, thyristor means 12 may be solid state devices such as back-to-back connected SCR's or a Triac.

Load 10 may be a transformer energized heater which is adapted to heat an area whose temperature is to be controlled. The temperature of this area is sensed by means including a structure 13 which originates an input signal to a switch 14. Switch 14 has a normal stable state and can be switched to an unstable state as a result of input 13. As switch 14 assumes its unstable state, load 10 is energized and the temperature of the area associated with input 13 increases.

A first disabling means 15 is connected in controlling relation to switch 14 to prevent switch 14 from assuming its unstable state at all times other than at a predetermined interval in each cycle of alternating current source 11.

As mentioned, load 10 may be a load comprising a load comprising a transformer which energizes a heater. This load results in a supply voltage-load current relationship as shown in FIG. 3 wherein sine wave 16 represents both the voltage waveform and the current waveform.

The resistive heater connected to the secondary of the transformer is reflected to the primary and the load (transformer and heater) appears as a resistive load. The load may be somewhat inductive, but FIG. 3 assumes that line voltage and load current are in phase. In the waveform, points 17 are, for purposes of explanation, designated as 0°, or the start of a full cycle.

Disabling means 15 is constructed and arranged such that the above mentioned predetermined interval in each cycle of alternating current source 11 corresponds to 90° voltage and current points 18, 19 etc., which points repeat at 360° intervals. Thus, initial firing of thyristor means 12 and energization of load 10 ocurs at maximum load current wave points of a given polarity, for example, when the load current wave is a positive maximum.

The actual load current at this time, as distinguished from wave 16, is, however, zero. Actual load current increases from zero, reaching a maximum positive value sometime between points 18 and 21, as the voltage wave is decreasing, and load current then approaches waveform 16 in a transient fashion.

I have found that in some cases the transformer will saturate if (1) turn-on of load current is not always achieved at a given portion of given half cycle of the voltage waveform, and (2) the energization of the transformer is not then maintained for the remainder of that given half cycle and for an even number of half cycles thereafter. I believe my invention utilizes a phenomena whereby the energy available from point 18 to point 21 is effective to insure that the transformer core is set to a given maximum point on its hysteresis loop, whereupon full cycles of load current can be applied to the transformer without saturating the core.

Referring to FIG. 4, the flux remenence of a transformer core (for example transformer 32 of FIG. 2) may be such that the core flux will reside at point 100 prior to energization of the transformer. Between points 18 and 21 on the voltage waveform, the core flux will be set to a maximum at 101. An even number of half cycles of energization of the core then assures that the flux will traverse the hysteresis curve from maximum point 101 to maximum point 102 and back to point 101, where the flux will be at all points 21' on the voltage waveform. Since it is only at the points 21' that thyristor means 12 can become nonconductive, the flux always returns to point 100 on its hysteresis curve after a firing burst.

A feedback structure 20 is associated with switch 14 to be responsive to the unstable state of the switch and to thereafter maintain the switch in its unstable state. The function of feedback 20 is to insure that thyristor means 12 will be maintained conductive through the zero load current crosover point 21 when the current is going from a positive to a negative value, and through point 17 when current is going from a negative to a positive value.

A second disabling means 22 is associated with the feedback 20 and this second disabling means is constructed and arranged to render feedback 20 inoperative sometime after the point 17 but before point 19. Thus, thyristor means 12 is always maintained conductive for full cycles of source 11 and is always deenergized at the end of a positive current half cycle. Furthermore, at every point such as 18 and 19, switch 14 is required to make a switching decision, as determined by the magnitude of input 13, to determine the number of full cycles of power to be applied to the load. Such energization of the load is called burst firing and the energy applied to the load is modulated in accordance with the length of the burst. That is the number of full cycles which are applied to the load.

In the event the load tends to saturate, thyristor means 12 is not damaged by high current. During the one-fourth cycle in which firing takes place (90°–180°), the flow of current sets the core to a maximum point on its hysteresis curve, from which the subsequent full cycle energization does not cause the load to saturate. The full cycles of energization insure that the load is always left at the same point on its hysteresis curve when the load is deenergized.

Referring to FIG. 2, this figure is a schematic showing of an embodiment of the invention disclosed in FIG. 1.

A source of alternating current, not shown, is connected to power input terminals 30, 31. Connected in series with these terminals is a load comprising a transformer 32 and a heater 33 connected in circuit with the secondary of the transformer. Thyristor means, in the form back-to-back connected SCR's 34 and 35, are connected in circuit with load 32. Conduction of the SCR's control energization of the load.

Heater 33 is adapted to be associated with an area to be heated, not shown, and the temperature of this area is sensed by an input temperature sensor 36 having a negative output terminal 37 and a positive output terminal 38. The magnitude of voltage present on terminals 37 and 38 varies inversely as the temperature. A ramp generator 39 also comprises a portion of the input. This ramp generator provides a positive going ramp on conductor 40. The frequency of ramp generator 39 is low with respect to the frequency of the alternating current source 30, 31. For example, the alternating current source may be a 60 cycle per second whereas the frequency of ramp generator 39 may be in the range of one-half cycle per second to 10 cycles per second.

Reference numeral 41 identifies a switch which comprises a Schmitt trigger made up of transistors 42 and 43, a high frequency pulser made up of transistor 44 and unijunction transistor 45, a gate means made up of transistors 46 and 47, and a source of DC supply 50.

When switch 41 is in its stable state, transistor 42 is nonconductive and transistor 43 is conductive. With transistor 42 nonconductive, a first output terminal 48 applies a positive voltage to the base electrode of transistor 44 and maintains this transistor nonconductive. With transistor 44 nonconductive, no voltage is applied to RC network 49, unijunction transistor 45 is maintained nonconductive, and firing pulses are not applied to SCR's 34 and 35, maintaining these SCRs nonconductive and load 32 deenergized.

The input to switch 41 exists at terminal 51. At this terminal the negative voltage provided from sensor 36 is summed with the positive ramp voltage present on conductor 40. The magnitude of the negative voltage as compared to the magnitude of the positive ramp voltage determines the point of turnon of transistor 46.

It is necessary that both of the transistors 46 and 47 be nonconductive in order for transistor 42 to be switched to a conductive state by virtue of the connection of its base electrode to the positive terminal of source 50.

At a time in the later portion of the ramp (when the positive ramp voltage has increased), the positive voltage at terminal 51 is sufficient to render transistor 46 conductive. As the temperature of sensor 36 drops, indicating a need for greater energization of load 33, the negative voltage on terminal 37 increases in magnitude and transistor 46 is maintained nonconductive for a longer period of time, providing a longer burst of energization to load 33.

Terminal 60 is a portion of a first disabling means which is effective to maintain transistor 47 conductive at all times other than a predetermined interval in each cycle of the alternating current source 30, 31. More specifically, a transformer 61 has its primary winding 62 connected to source 30, 31 and its secondary winding 63 connected through two 45° phase-shifting networks 64 and 65 and a full wave rectifier 66 to apply full wave rectifier voltage through resistor 67 to terminal 60. Also, the voltage existing between end terminal 68 and tap 69 of secondary winding 63 is connected through half-wave rectifier 71 to terminal 60. The phasing of the connection of half-wave rectifier 71 to source 68, 63 is such that a positive half wave of voltage is applied to terminal 60 during the 180°–360° half cycle of source 30, 31. Since the full wave rectified voltage applied to terminal 60 through resistor 67 (by virtue of rectifier 66) is shifted by 90°, the voltage at terminal 60 falls to zero at the 90° interval in each cycle of the alternating current source 30, 31 and is positive at all other times. Thus, transistor 47 is rendered nonconductive at this 90° interval.

It is only during this interval that switch 41 can make a switching decision. Depending upon the voltage at terminal 51, switch 41 can at this time assume its unstable state.

If it is assumed that switch 41 does in fact switch, transistor 44 is rendered conductive and RC network 49 charges from source 50. The time constant of this RC network is such that a five kilocycle pulse is produced, applying five kilocycle firing voltage to the gate electrodes of SCR's 34 and 35.

Referring again to FIG. 3, the maximum load current point 18, in the structure of FIG. 2, is at the 90° point of the source 30, 31 (curve 16) and during this interval transistor 47 is rendered nonconductive.

When switch 41 assumes it unstable state, a second output terminal 80 applies a positive voltage through Zener diode 81 to the base of transistor 82. This positive voltage, which results by virtue of nonconduction of transistor 43, is effective to hold the Schmitt trigger in its unstable state. Specifically, a positive voltage is applied from source 50 through transistors 95 and 82 to the base electrode of transistor 42.

This condition is maintained through the zero load current crossover points 21 and 17 (FIG. 3). Subsequent thereto, but before the next succeeding maximum load current point 19, a second disabling means is effective to disable the feedback.

Reference numeral 90 is the output terminal of the second disabling means. This disabling means includes a full wave rectifier 91 which is connected to the output of the 45° phase shifter 64. Thus, a 45° phase shifted and full wave rectified DC voltage is applied through resistor 92 to terminal 90. A half-wave rectifier 93 is connected to terminal 68 of secondary winding 63 and applies a positive half wave of voltage to terminal 90 during the 180°–360° half cycle of the source 30, 31. The summation of the output of rectifiers 91 and 93 is such that the voltage of terminal 90 goes to zero at 45° in each cycle of the alternating current source 30, 31. This second predetermined interval is 315° after the first predetermined interval—the first interval occurred at 90° on one cycle and the second interval occurs at 45° on the next cycle. At this interval (45°), the base voltage of transistor 95 goes to zero and this transistor is rendered nonconductive. With transistor 95 nonconductive, a positive voltage is no longer applied to the base electrode of transistor 42 from the positive terminal of source 50 and the feedback from terminal 80 to the base electrode of transistor 42 is disabled.

Switch 14 then assumes its stable state and is maintained in its stable state by virtue of conduction of transistor 47. However, the SCR which is conducting at this time remains conductive even though its gate drive is removed. This event may occur anywhere between the points 17 and 19 on the load current waveform. That is, this event must lag the turn-off of transistor 47 by more than 270° but less than 360°. The apparatus of FIG. 2 provides the event at 315° after point 18.

As the load current waveform approaches point 19, the first disabling means is effective to again render transistor 47 nonconductive. If the proper relationship exists between the output voltage of sensor 36 and that of ramp generator 39, switch 41 again assumes its unstable state to continue energization of load 32, 33. The only time at which the load can be energized is at points such as 18 and 19, and the only time that the load can be deenergized is at points such as 21' these points constituting the end of even cycles of energization of the load.

The embodiments of the invention in which an exclusive property or right is claimed are defined as follows:

1. Apparatus for use in controlling the firing of thyristor means, the thyristor means being adapted to connect load means to a source of alternating current; the apparatus comprising:

switch means having a stable state and an unstable state, means adapted to connect said switches means in controlling relation to the thyristor means to render the thyristor means conductive when said switch means assumes said unstable state, input signal means connected in controlling relation to said switch means, first means controlled from the source of alternating current and connected to maintain said switch means in said stable state at all times other than first predetermined interval in each cycle of alternating current, and second means, including further means controlled from the source of alternating current, to maintain said switch means in said unstable state for a second predetermined interval greater than an even number of zero-crossover points of the alternating current (270°) but less than to said first predetermined interval in any subsequent cycle of the alternating current (360°).

2. Apparatus as defined in claim 1 for use in energizing a transformer load, wherein said first means comprises first disabling means connected to maintain said switch means in said stable state at all times other than at approximately 90° in each cycle of the alternating current, and wherein said second means comprises feedback means responsive to said switch means assuming said unstable state to maintain said switch means in said unstable state, and said further means comprising second disabling means connected to disable said feedback means at said second predetermined interval in each cycle of the alternating current, said second intervals lagging said first intervals by more than 270° and less than 360°.

3. Apparatus as defined in claim 1 wherein the switch means includes a Schmitt trigger which when in said unstable state renders a high frequency source of pulsating signal effective to render said thyristor means conductive.

4. Apparatus as defined in claim 2 wherein said feedback means includes normally conductive control means, and wherein said second disabling means renders said normally conductive control means nonconductive at said second predetermined interval.

5. Apparatus as defined in claim 2 wherein said switch means includes a Schmitt trigger having a first output adapted to be connected in controlling relation to the thyristor means, and having a second output; wherein said feedback means includes normally conductive control means connecting said second output in a manner to maintain said switch means in said unstable state; and wherein said second disabling means renders said normally conductive control means nonconductive at said second predetermined interval.

6. Apparatus as defined in claim 5 wherein said input signal means includes a ramp generator whose output is of a given polarity which is summed with a variable control signal of the opposite polarity, the magnitude of said control signal as compared to the output of said ramp generator controlling said switch means to said unstable state at approximately 90° in each cycle of the alternating current.

7. Apparatus as defined in claim 6 wherein said Schmitt trigger includes an input having a first and a second parallel connected normally conductive switch means connected to shunt said input, wherein said control signal and said ramp generator are connected to control said first normally conductive switch means, and wherein said first disabling means is connected to control said normally conductive switch means.

8. Apparatus as defined in claim 1 wherein said switch means includes a two-input gate, wherein said input signal means is connected in controlling relation to one of said gate inputs, and wherein said first means is connected in controlling relation to the other of said gate inputs.

9. Apparatus as defined in claim 8 wherein said switch means includes an input, wherein said two-input gate includes a first and a second normally conductive transistor connected to shunt said input, wherein said input signal means is connected to control said first transistor, and wherein said first means is connected to said second transistor to render said second transistor nonconductive at said first predetermined interval in each cycle of the alternating current.

10. Apparatus as defined in claim 9 wherein said switch means includes a trigger having a first output adapted to be connected in controlling relation to the thyristor means, and having a second output; wherein said second means includes feedback means having normally conductive control means connecting said second output in a manner to maintain said switch means in said unstable state; and wherein said further means renders said normally conductive control means nonconductive at said second predetermined interval.

References Cited

UNITED STATES PATENTS

| | | |
|---|---|---|
| 3,329,887 | 7/1967 | Schaeve. |
| 3,356,784 | 12/1967 | Bertioli et al. _____ 219—501 X |
| 3,372,328 | 3/1968 | Pinckaers. |
| 3,466,527 | 9/1969 | Chun. |

WILLIAM M. SHOOP, JR., Primary Examiner

A. D. PELLINEN, Assistant Examiner

U.S. Cl. X.R.

219—494; 307—133; 323—24